Patented June 16, 1942

2,286,882

UNITED STATES PATENT OFFICE 2,286,882

TITANIUM OXIDE PIGMENT PRODUCTION

Foord Von Bichowsky, Arden, and Robert M. McKinney, Wilmington, Del., assignors to E. I. du Pont de Nemours & Company, Wilmington, Del., a corporation of Delaware No Drawing. Application September 13, 1939, Serial No. 294,654

10 Claims. (Cl. 23—202)

This invention relates to the production of titanium oxide pigments, and more particularly to the production of pigment titanium oxide having substantially the X-ray diffraction pattern of rutile.

More specifically, the invention relates to a novel method for preparing rutile titanium oxide pigments from hydrolyzed, raw anatase pigment through calcination treatment under varying conditions.

Anatase raw pigment obtained from the hydrolysis of titanium sulfate solutions may be directly converted to rutile through calcination provided resort is had to temperatures of a relatively high order, i. e., in excess of subtantially 1000° C. However, products resulting from such calcination conversions are relatively poor in pigment properties and especially deficient and low in tinting strength, color and hiding power. It appears the relatively high temperatures required to effect said conversion exert an adverse effect upon pigment properties ultimately exhibited by the final product. As a result, the product obtained is often wholly unfitted for an intended pigment use.

We have found that the poor pigmentary properties which prior converted rutile titanium oxide products possess can be effectively remedied and it is therefore among the objects of this invention to provide a novel method for attaining such result. We have also found that when relatively pure anatase titanium oxide is calcined at relatively high temperatures and under substantially reducing conditions, a lower oxide of titanium is obtained, but that rutile is not formed, even when temperatures of the order of substantially 1200° C. or higher are resorted to; and that, when the resultant lower oxide of titanium is recalcined at temperatures substantially below those normally required to effect conversion of the starting material, the same becomes oxidized to high quality pigment rutile. It is among the particular objects of the invention, therefore, to provide a novel process for obtaining high quality rutile titanium oxide which possesses excellent tinting strength, color and hiding power, and through two-stage calcination and conversion of anatase titanium oxide. A further particular object is to produce a high quality rutile titanium oxide pigment by converting anatase raw pigment, extremely low in or substantially free of metallic impurities, through the medium of recalcination, the final calcination step in which rutile crystals are formed being effected at a much lower order of temperature than that at which the initial heat treatment is had.

The foregoing and other objects and advantages are accomplished in this invention which comprises producing a rutile titanium oxide pigment possessing excellent tinting strength, color and hiding power, by subjecting a relatively pure titanium-oxygen compound to initial calcination under conditions which are substantially reducing in character and thereafter recalcining the product from said initial calcination under conditions which are substantially oxidizing in nature.

In a more specific and preferred embodiment, the invention comprises obtaining an improved high-quality rutile titanium oxide pigment by first calcining precipitated, purified, raw anatase titanium oxide in the presence of a reducing agent and under temperatures which normally effect conversion of anatase to rutile, and thereafter transforming the unconverted product to rutile by recalcining the same in the presence of an oxidizing agent but at a relatively lower order of temperature and within a range at which conversion to rutile does not normally take place.

In the preparation of an improved rutile titanium oxide pigment, in accordance with one preferred adaptation of the invention, use is had of precipitated, raw anatase titanium oxide as a starting material. Such precipitate comprises that normally obtained from the hydrolysis of titanium sulfate solutions. To insure ultimate production of a satisfactory rutile pigment, said starting material must be in a relatively high state of purity and free particularly of color-imparting impurities which would adversely affect the pigment properties of the final rutile product. A conveniently useful type of precipitate comprises that produced in accordance with the disclosures of U. S. Reissue Patents 18,854 and 18,790.

Initially, the purified anatase is subjected to calcination for a period of about 1 to 3 hours in a suitable calciner, such as an externally-heated muffle furnace or, preferably, an internally-fired, rotating kiln, and in a reducing atmosphere (obtained by burning reducing gases) to convert part of the $TiO_2$ to a lower oxide, such as $Ti_2O_3$, $Ti_3O_5$ or other sub-oxides, and at temperatures ranging from substantially 1100° C. to 1250° C.

Finally, and preferably without any interruption in the treatment, the reduced oxide is subjected to a second calcination treatment but at a relatively lower order of temperature and in an oxidizing atmosphere, whereby the sub-oxide becomes oxidized back to $TiO_2$ and converted to the rutile crystalline form. Said secondary calcination is preferably effected at temperatures lower than the normal conversion temperature for the anatase product initially used, and of the order of substantially 700 to 850° C., the preferred oxidizing agents comprising oxygen or air, such agents being passed over the product under treatment as it passes through the furnace.

Since the temperature in the second stage calcination is so much lower than the first, it will be apparent that a two-stage calcination operation is had, the first being under high temperature reducing conditions and the second under somewhat delayed cooling in an oxidizing atmosphere. The calciner discharge from said second stage of calcination is subjected to conventional grinding and finished in accordance with usual methods of pigment production. When suitably ground and finished, there will result a high-quality, white rutile titanium oxide pigment, possessing excellent color, tinting strength and hiding power, and suitable for use in the most exacting commercial requirements, especially in the paint industry.

To a more complete understanding of the invention, the following examples are given in illustration thereof, none of which are to be considered as in any wise limiting the underlying concepts of said invention:

Example I

Anatase raw pigment produced by hydrolysis of titanium sulfate solution was heated in an electrically heated rotating furnace to 1150° C. A current of hydrogen was passed over the pigment during the heating which lasted for one hour. The product after removal from the furnace was bluish gray in appearance. When analyzed by the well-known X-ray method, the pattern indicated the presence of reduced titanium oxide but no anatase or rutile. The blue-gray reduced product was then heated in a stationary furnace at 620° C. for one hour with a current of air blowing over the pigment during heating. The product was of excellent whiteness and when examined by the X-ray method showed the presence of 60% rutile. Another portion of the blue-gray residue was calcined for one hour at 775° C. in a current of air and the product was white and contained 80% rutile.

Example II

Anatase raw pigment prepared by the hydrolysis of titanium sulfate solution was thoroughly washed, acid digested and washed again to remove all possible impurities. The purified raw pigment was fed into a rotating furnace internally fired by burning natural gas (previously purified). The gas was fed counter-current to the movement of the pigment through the furnace. The temperature in the hottest part of the furnace was 1250° C. The time for the pigment to pass through the furnace was 2 hours. The product from the reducing furnace was blue-gray in color and was neither rutile nor anatase according to well-known X-ray analysis, showing only the pattern of a lower oxide of titanium. The blue-gray product was allowed to cool to about 800° C. and was then fed into a rotating furnace in which an oxidizing atmosphere was maintained by means of a current of air passing through the furnace. The product was cooled to about 600° C. in passing through the oxidizing furnace in contact with unheated air. The resulting product was very white in color and when analyzed by the X-ray method was shown to be 100% rutile.

While the invention has been illustratively described above in certain preferred adaptations thereof, it should not be considered as limited thereto. Thus, although preferably a continuous type of two-stage calcination operation is resorted to, a discontinuous or batch type of procedure may, if desired, be employed.

Also, the variables, time and temperature, in the first and second calcination steps, will be found to be somewhat dependent on each other, and that, in general, temperatures ranging from substantially 1000° C. to 1300° C. may be used in the initial calcination operation, while temperatures ranging from substantially 600 to 850° C. may be employed in the final stage calcination.

Again, though gaseous reducing agents such as hydrogen, carbon monoxide, methane, or mixtures of such gases in the form of coal, water or producer gas, etc., are preferred for use, other gaseous, as well as solid reducing agents, such as carbon, charcoal, gas coke, lamp black, or similar carbonaceous materials and which are relatively free of impurities, such as ash containing iron or other objectionable constituents, can be used. In selecting a given reducing agent, whether gaseous, solid or liquid, care should be exercised in employing in the invention only those which are substantially pure in character, and which contain no color-imparting or other impurities which would tend to adversely affect the quality of the final pigment product.

The amount of reducing agent which is employed is preferably sufficient to effect reduction of a substantial amount of the titanium oxide to a lower or sub-oxide form of titanium. It is not essential, however, that all of the titanium oxide be reduced to such condition. Preferably, the reduction is so controlled that the discharge material from the initial calcination stage contains from about 2 to 40% of $TiO_2$ in the reduced condition, calculated as $Ti_2O_3$. When the invention is conducted under these preferred conditions, it will be found that the product from the initial calcination will be substantially devoid of titanium oxide in the rutile crystalline form and more amenable to conversion to rutile during the final calcination step.

As in the instance of reducing agents, the use of relatively pure oxidizing agents, such as oxygen or purified air, will be found to induce the most effective results in the invention. Preferably, and as indicated above, gases containing a substantial amount of oxygen are caused to be passed over the product being calcined as it passes through the furnace.

Furthermore, though precipitated, relatively pure anatase $TiO_2$ comprises a preferred material for treatment in the invention, other types of hydrolysates from titanium salt solutions other than titanium sulfate, such as those from chloride, nitrate, oxalate or fluoride solutions, etc., may be employed for treatment in obtaining the final improved rutile titanium oxide pigment of this invention. Generally, use is contemplated of any type of titanium oxygen compound which under the plural-stage calcination conditions of the invention is adapted to convert to a rutile titanium oxide and provide a final, high-quality pigment substance. Examples of such useful titanium compounds include hydrated titanous oxide ($Ti_2O_3 \cdot XH_2O$).

As will be evident, the invention affords a direct process for producing a high quality rutile pigment from titanium oxygen compounds, and particularly from hydrolyzed, precipitated raw titanium oxide pigment through calcination treatment, first in a reducing atmosphere, to convert part of the $TiO_2$ to a lower oxide, and then in an oxidizing atmosphere under a temperature of a relatively lower order, to convert the reduced oxide to $TiO_2$ in the rutile crystalline form. In particular, it affords a very advantageous process for preparing rutile pigment from anatase raw pigment (acid cake) obtained from the hydrolysis of titanium salt solutions, especially the sulfate. In the procurance of optimum results under the invention, it has been found that the use of such precipitated raw titanium oxide pigment from a hydrolysis procedure appears essential to our process. Through use of a relatively pure form of titanium oxide in the reducing calcination, an excellent rutile pigment product is obtained upon reoxidation through calcination at relatively low temperatures. Thus, in the present invention one avoids the use of relatively high temperatures during the conversion to rutile and which would otherwise induce objectionable sintering with consequent production of a final product which would not only be low in tinting strength and hiding power, but would be poor in color as well. In the instant process, conversion to rutile is effected at a relatively low order of temperature to insure production of a pigment product which exhibits excellent tinting strength, hiding power and color characteristics.

We claim as our invention:

1. A process for producing a rutile titanium oxide pigment comprising subjecting purified, precipitated anatase titanium oxide to initial calcination at a temperature ranging from substantially 1000° C. to 1300° C. and under reducing conditions, and thereafter recalcining the reduced product in an oxidizing atmosphere and at a temperature ranging from substantially 600 to 850° C.

2. A process for producing a rutile titanium oxide pigment comprising subjecting purified, precipitated anatase titanium oxide to initial calcination at a temperature ranging from substantially 1000° C. to 1250° C. and under reducing conditions, and thereafter recalcining the reduced product in an oxidizing atmosphere and at a temperature ranging from substantially 700 to 850° C.

3. A process for producing an improved titanium oxide pigment in substantially the rutile crystalline pattern, comprising initially calcining a precipitated titanium oxide compound under substantially reducing conditions to convert said compound to a lower oxide, and then calcining the resulting reduced product under substantially oxidizing conditions in order to oxidize the same and substantially convert the titanium oxide compound to rutile.

4. A process for producing an improved titanium oxide pigment exhibiting substantially the X-ray diffraction pattern of rutile, which comprises, initially calcining relatively pure, precipitated anatase titanium oxide in the presence of a reducing agent to convert said titanium oxide to a sub-oxide, and then subjecting the resulting reduced product to calcination treatment in the presence of an oxidizing agent in order to oxidize said product and convert the titanium oxide to substantially rutile.

5. A process for producing an improved titanium oxide pigment exhibiting substantially the crystalline pattern of rutile which comprises, initially calcining relatively pure, hydrolytically precipitated anatase titanium oxide in the presence of a reducing agent in order to convert said titanium oxide to a lower or sub-oxide form of titanium, and subsequently oxidizing said reduced product and converting the titanium oxide to substantially rutile by subjecting the reduced product to further calcination treatment but in the presence of an oxidizing agent and at a temperature substantially lower than that employed in effecting said initial calcination.

6. A process for producing an improved titanium oxide pigment exhibiting substantially the crystalline pattern of rutile which comprises, initially calcining relatively pure, hydrolytically precipitated anatase titanium oxide in the presence of a gaseous reducing agent to convert a substantial portion of said titanium oxide to a sub-oxide of titanium, and then oxidizing the resulting reduced product and converting the titanium oxide to substantially rutile by subjecting said product to further calcination treatment but in the presence of a gaseous oxidizing agent.

7. A process for producing a rutile titanium oxide pigment exhibiting improved color, tinting strength and hiding power values, which comprises initially calcining hydrolytically precipitated anatase $TiO_2$ in the presence of a reducing agent to convert from about 2% to about 40% of said $TiO_2$ to a sub-oxide, calculated as $Ti_2O_3$, and thereafter oxidizing the sub-oxide product and converting the $TiO_2$ to substantially rutile by calcining the reduced sub-oxide product in the presence of an oxidizing agent.

8. A process for producing a rutile titanium oxide pigment exhibiting improved color, tinting strength and hiding power, which comprises hydrolyzing a titanium sulfate solution to obtain relatively pure raw pigment anatase $TiO_2$, subjecting said anatase product to initial calcination treatment in the presence of a gaseous reducing agent to convert from about 2% to 40% of said $TiO_2$ to a sub-oxide, calculated as $Ti_2O_3$, and then subjecting the reduced, sub-oxide product so obtained to further calcination but in the presence of an oxidizing agent and at a lower temperature than that employed in said initial calcination treatment, to oxidize said reduced product to $TiO_2$ and convert said $TiO_2$ to substantially rutile.

9. A process for preparing an improved rutile titanium oxide pigment, which comprises initially subjecting precipitated and purified anatase obtained from the hydrolysis of a titanium sulfate solution to calcination treatment in the presence of a sufficient amount of a gaseous reducing agent to convert said anatase titanium oxide to a lower or sub-oxide form of titanium-oxygen compound, thereafter, and without any interruption in the calcination treatment, calcining the reduced product but in the presence of an oxidizing agent, to oxidize said product and convert the titanium oxide to substantially rutile.

10. A process for producing a rutile titanium oxide pigment which comprises initially subjecting precipitated and purified anatase $TiO_2$, obtained from hydrolytic precipitation of a titanium sulfate solution, to calcination treatment in the presence of a gaseous reducing agent at temperatures ranging from substantially 1000 C. to about 1250° C. to convert said anatase $TiO_2$ to a sub-oxide of titanium, thereafter, and without any interruption in the calcination treatment, continuing calcination but in the presence of a gaseous oxidizing agent and at temperatures ranging from substantially 700° C. to about 850° C. to oxidize said reduced product to $TiO_2$ and convert said $TiO_2$ to substantially rutile.

FOORD VON BICHOWSKY.
ROBERT M. McKINNEY.